United States Patent
Comer et al.

(10) Patent No.: US 7,561,783 B2
(45) Date of Patent: Jul. 14, 2009

(54) INTERLEAVING OF BASE AND ENHANCEMENT LAYERS FOR HD-DVD

(75) Inventors: Mary LaFuze Comer, Fairmount, IN (US); Shu Lin, Indianapolis, IN (US)

(73) Assignee: Thomson Licensing, Boulogne Billancourt (FR)

(*) Notice: Subject to any disclaimer, the term of this patent is extended or adjusted under 35 U.S.C. 154(b) by 788 days.

(21) Appl. No.: 10/521,308

(22) PCT Filed: Jul. 15, 2003

(86) PCT No.: PCT/US03/21974

§ 371 (c)(1),
(2), (4) Date: Jan. 14, 2005

(87) PCT Pub. No.: WO2004/008747

PCT Pub. Date: Jan. 22, 2004

(65) Prior Publication Data

US 2005/0185937 A1    Aug. 25, 2005

Related U.S. Application Data

(60) Provisional application No. 60/430,558, filed on Dec. 3, 2002, provisional application No. 60/396,397, filed on Jul. 16, 2002.

(51) Int. Cl.
*H04N 5/00* (2006.01)
*H04N 7/26* (2006.01)

(52) U.S. Cl. ............................ 386/125; 386/124

(58) Field of Classification Search .................. 386/125, 386/124, 46, 109, 111, 112, 45
See application file for complete search history.

(56) References Cited

U.S. PATENT DOCUMENTS

| 4,963,991 | A |   | 10/1990 | Honjo |
| 5,377,051 | A |   | 12/1994 | Lane et al. |
| 6,493,506 | B1 | * | 12/2002 | Schoner et al. ............. 386/126 |
| 7,020,195 | B1 | * | 3/2006 | McMahon ............. 375/240.11 |
| 2003/0147629 | A1 | * | 8/2003 | Kikuchi et al. ............... 386/69 |
| 2006/0126962 | A1 | * | 6/2006 | Sun ........................... 382/268 |

OTHER PUBLICATIONS

Search Report dated Nov. 25, 2003.

* cited by examiner

*Primary Examiner*—Robert Chevalier
(74) *Attorney, Agent, or Firm*—Robert D. Shedd; Robert B. Levy; Jorge Tony Villabon

(57) ABSTRACT

A method of providing multiple versions of a digital recording by using a first and second stream identification. The method can include the step of encoding a base layer having data representing a first version of a digital recording. The base layer can be encoded with a first stream identification, which can be 0xEO. The method also can include the step of encoding an enhancement layer with enhancement data which can be combined with the base data to represent a second version of the digital recording. The enhancement layer can be encoded with a second stream identification which can be 0xBF, 0xFA, 0xFB, 0xFC, 0xFD or 0xFE. The base and enhancement layers can be multiplexed.

19 Claims, 5 Drawing Sheets

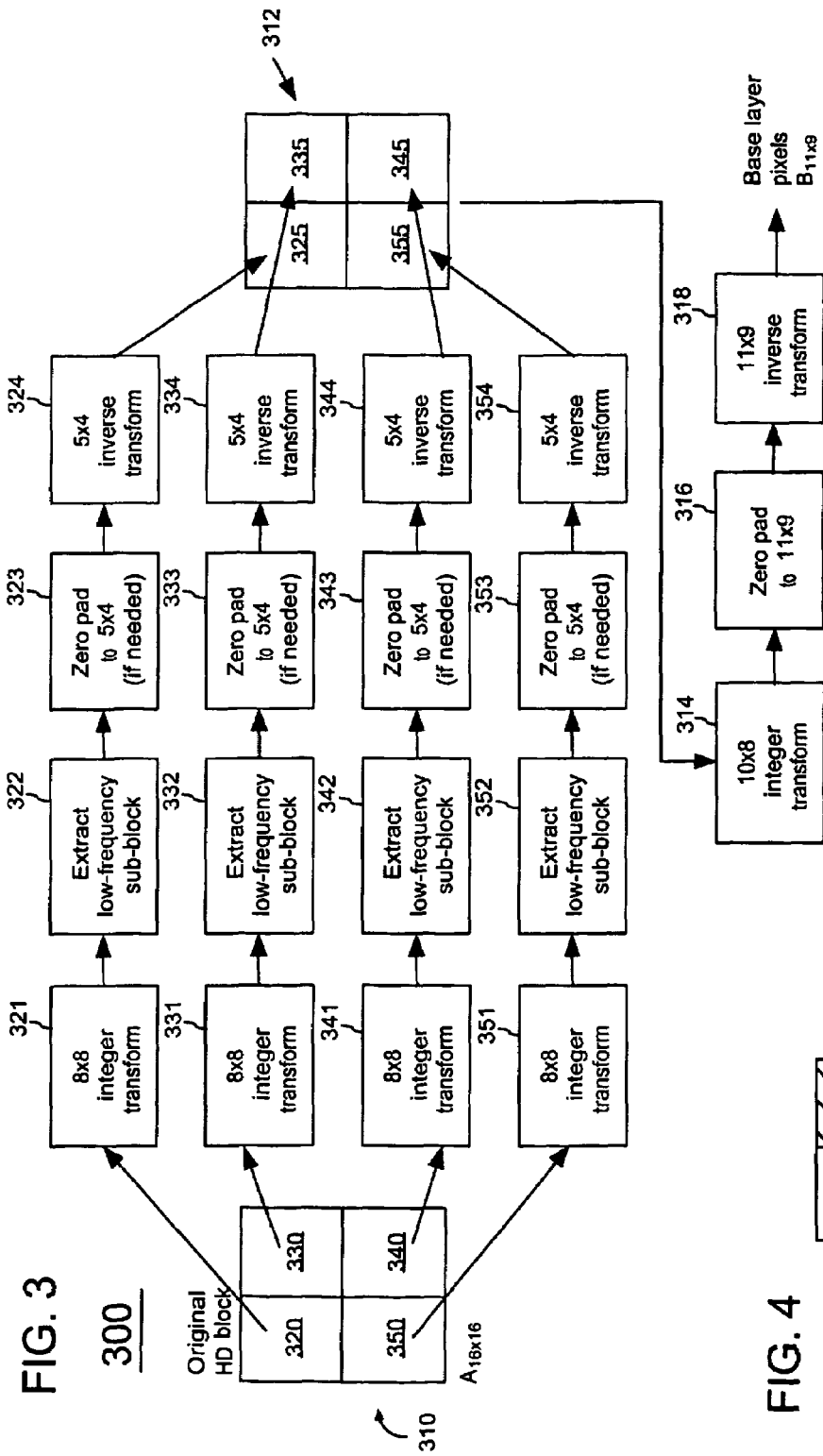

INTERLEAVING OF BASE AND ENHANCEMENT LAYERS FOR HD-DVD

CROSS REFERENCE TO RELATED APPLICATIONS

This application claims the benefit, under 35 U.S.C. § 365 of International Application PCT/US03/21974, filed Jul. 15, 2003, which was published in accordance with PCT Article 21(2) on Jan. 22, 2004 in English and which claims the benefit of U.S. provisional patent application No. 60/396,397, filed Jul. 16, 2002 and U.S. provisional patent application No. 60/430,558, filed Dec. 3, 2002.

BACKGROUND OF THE INVENTION

1. Statement of the Technical Field

The inventive arrangements relate generally to methods and apparatus for video systems, and more particularly to digital video disc (DVD) storage media.

2. Description of the Related Art

DVD (digital video disc or digital versatile disc) is an optical disc technology which can store much more data than a CD-ROM. In particular, using conventional red laser technology, a single layer DVD can hold 4.7 GB of data on each of its two sides and a dual layer DVD can hold 9.0 GB of data on each of its two sides. In comparison, a CD-ROM can hold approximately 600 MB of data. Due to their large storage capacity and their convenience of use, DVD's have quickly become the preferred storage medium for video replay, replacing both video cassettes tapes and laser discs. In particular, a typical DVD-video can hold a 133-minute movie on one of its two sides using MPEG-2 file compression. The other side of the DVD oftentimes is used for DVD identification and labeling purposes.

There are potentially two primary presentation formats for movies recorded on DVD's, namely standard definition (SD) which has either a 16:9 or 4:3 aspect ratio, and high definition (HD) which has a 16:9 aspect ratio. However, because a typical single layer DVD only can hold up to a 133 minute SD movie on a side, DVD-videos are usually provided only with one of the two presentation formats. In some instances, however, both sides of the DVD are used to provide both presentation formats. Specifically, a standard definition version of a movie can be provided on one side of the DVD while a high definition version of the movie could be provided on the other side. Unfortunately, when both sides of the DVD are used for data storage, there is little room for DVD identification and labeling. Accordingly, what is needed is a DVD storage technology which can be used to store both SD and HD versions of a movie on a single side of a DVD. Moreover, such a DVD should be compatible with existing SD-DVD players.

SUMMARY OF THE INVENTION

The present invention relates to a method of providing multiple versions of a digital recording by using a first and second stream identification. The method can include the step of encoding a base layer having data representing a first version of a digital recording. The base layer can be encoded with a first stream identification, which can be 0xE0. The method also can include the step of encoding an enhancement layer with enhancement data which can be combined with the base data to represent a second version of the digital recording. The enhancement layer can be encoded with a second stream identification which can be 0xBF, 0xFA, 0xFB, 0xFC, 0xFD or 0xFE. The base and enhancement layers can be multiplexed. For example, the base and enhancement layers can be interleaved.

The base layer encoding can be in a format substantially similar to MPEG-2. The enhancement layer encoding can be in a format substantially similar to H.264. Further, the second version of the digital recording can include high definition program content. The base layer and the enhancement layer can be stored on a single side of the storage medium, for example on a digital video disc (DVD).

The present invention also relates to a DVD medium. The DVD medium can include a base layer having base data representing a first version of a digital recording. The base layer can be encoded with a first stream identification, which can be 0xE0. The DVD medium also can include an enhancement layer having enhancement data which can be combined with the base data to represent a second version of the digital recording, for example a version having high definition program content. The enhancement layer can be encoded with a second stream identification which can be 0xBF, 0xFA, 0xFB, 0xFC, 0xFD or 0xFE. Further, the base and enhancement layers can be multiplexed. For example, the base and enhancement layers can be interleaved.

The base layer and the enhancement layer can be stored on a single side of the DVD medium. In one arrangement, the base layer and enhancement layers can be stored on different physical layers of a multi-layer DVD. The base data can be stored in a format substantially similar to MPEG-2 and the enhancement data can be provided in a format substantially similar to H.264.

BRIEF DESCRIPTION OF THE DRAWINGS

FIG. 3 is a block diagram for a down-sampling algorithm usable with the encoder of FIG. 1.

FIG. 4 is a block diagram for transform coefficients usable with the encoder of FIG. 1.

DETAILED DESCRIPTION OF THE PREFERRED EMBODIMENT

An embodiment of the present invention describes a scalable video encoding scheme that can allow multiple versions of a title, such as a movie or other presentation, to be stored on a single storage medium. For example, one standard definition (SD) version and one high definition (HD) version of a title can be stored on a single digital video disc (DVD). In particular, SD data representing the SD version can be coded and stored on the DVD as a base layer using a compression scheme compatible with existing SD-DVD players, for example MPEG-2. Further, the SD version can be stored in a video stream (SD video stream) having a stream identification (SD identifier) which is compatible with existing SD-DVD players. For example, the stream identification assigned to the SD video stream can be 0xE0.

HD data representing the HD version of the title can be coded and stored on the DVD as an enhancement layer using a compression scheme which provides greater compression than MPEG-2, for example H.264. Further, the HD version can be stored in a video stream (HD video stream) that has a stream identification (HD identifier) which is different than the SD identifier. In the preferred arrangement, the HD identifier can be an identifier not currently used by MPEG. For instance the HD identifier can be 0xBF, which is a stream identification reserved for private stream 2, or the HD identifier can be in the range of 0xFA to 0xFE, which are reserved identifications. Nonetheless, the invention is not so limited as stream identifiers may change as coding standards evolve.

Accordingly, DVD's can be produced which are compatible both with SD-DVD players and hybrid HD-DVD players. While the base layer can be accessed by SD-DVD players, both the base and enhancement layers can be accessed by HD-DVD players. Data on the enhancement layer can be differentiated from data on the base layer using the SD and HD stream identifiers.

Figure 1:
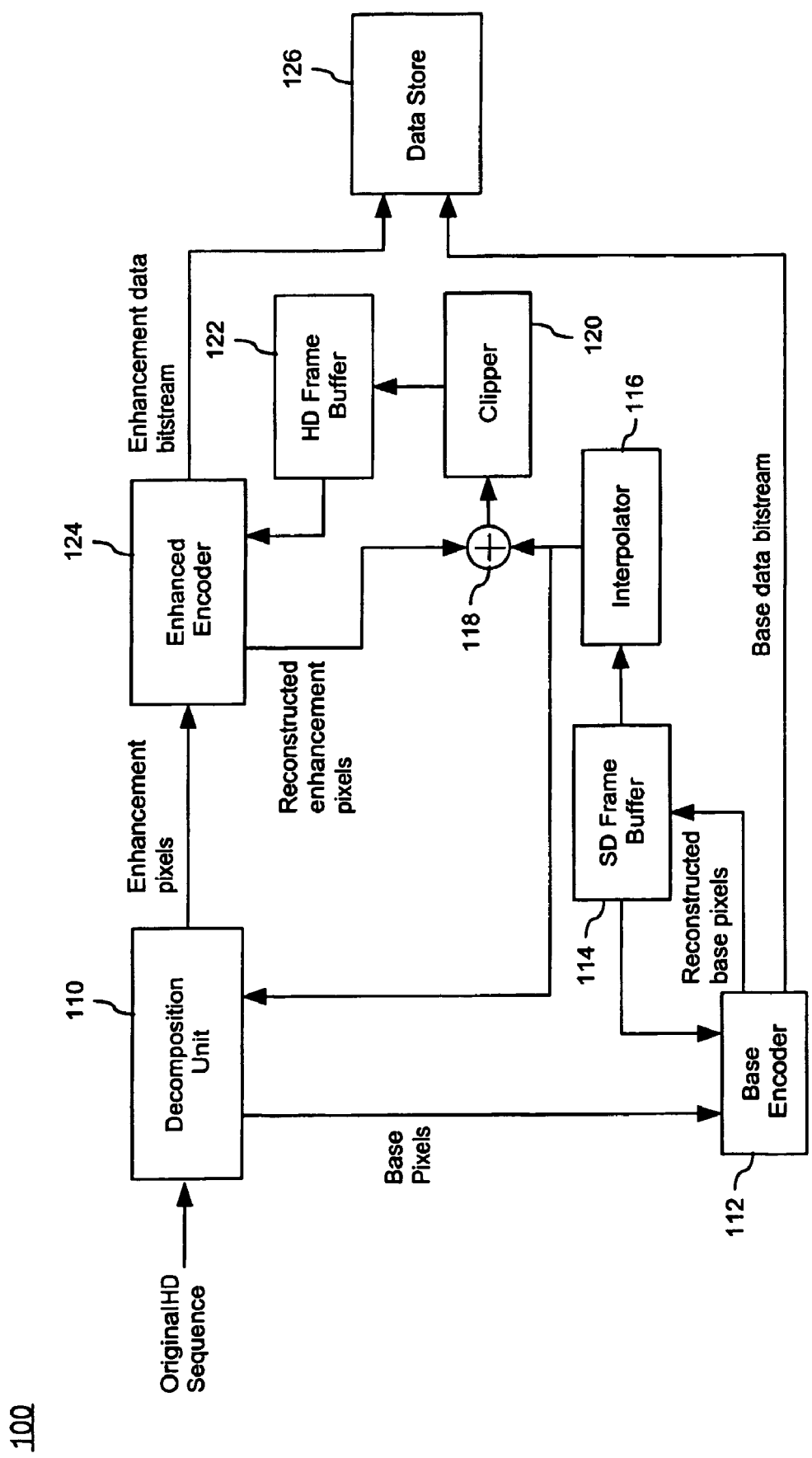
FIG. 1 is a block diagram illustrating hybrid scalable encoder which is useful for understanding the present invention.

Referring to FIG. 1, an exemplary block diagram is shown of a hybrid scalable encoder (encoder) 100 which can parse an original HD sequence, such as a video title, into a base data bitstream and an enhancement data bitstream. The encoder 100 can be realized in hardware, software, or a combination of hardware and software. For example, the encoder 100 can include one or more processors which execute program code and process data. Such a processor can be a central processing unit (CPU), a digital signal processor (DSP), an application specific integrated circuit (ASIC) or any other suitable processor. The encoder 100 can include a decomposition unit 110, a base encoder 112, an SD frame buffer 114, an interpolator 116, a summing block 118, a clipper 120, an HD frame buffer 122, and an enhancement encoder 124.

The decomposition unit 110 can parse the original HD sequence into base pixels and enhancement pixels. The base pixels can be pixels representing an SD version of the sequence. The enhancement pixels can be pixels which can be recombined with the base pixels to represent an HD version of the sequence.

The base encoder 112 can encode the base pixels into a format recognizable by an SD-DVD and output a base data bitstream. Similarly, the enhancement encoder 124 can encode the enhancement pixels using a suitable coding scheme and output an enhancement data bitstream. In the preferred arrangement, the compression scheme provided by the encoders 112, 124 should provide adequate coding efficiency to store both the SD data and the enhancement data on a single side of a DVD. Accordingly, one side of the DVD can be available for labeling purposes. For example, the base encoder 112 can encode the base pixels using an MPEG-2 format. Compression schemes which can be used for coding the enhancement data are modified versions of H.264, also known as JVT, MPEG-4 Part 10 or AVC, or any other suitable compression scheme. Although MPEG-2 also can be used for coding the enhancement data, MPEG-2 may not provide as much compression as other compression schemes, such as H.264. In consequence, the use of MPEG-2 for coding the enhancement data may limit the length or quality of an HD version of a title stored on a DVD.

In the instance that a modified version of H.264 is used, the modification can include an extra filtering step which can be used during motion compensation. Further, transform coefficients can be scanned in an order that differs from the order in which transform coefficients are scanned for non-scalable H.264. The new scan order can place base layer coefficients representing blocks of pixels before associated enhancement layer coefficients. Restrictions also can be made on coding modes.

It should be noted that audio/video compression schemes are known to the skilled artisan. Notably, both MPEG and H.26x are evolving sets of standards for video and audio compression. MPEG standards are generated by the International Organization for Standardization (ISO) and the International Electrotechnical Commission (IEC), and currently include MPEG-1, MPEG-2, MPEG-4, and MPEG-7. MPEG-21 is currently under development. H.26x standards are generated by the International Telecommunication Union—Telecommunication Standardization Sector (ITU-T) and currently include H.261, H.262, H.263 and H.264. Of course, video and audio coding standards are continually evolving. Accordingly, those skilled in the art will recognize that the present invention is not limited to the particular coding standards identified herein.

Continuing in FIG. 1, the SD frame buffer 114 can be a data buffer associated with the base encoder 112 to buffer reconstructed base pixels created by the base encoder 112. Such reconstructed base pixels may be subsequently referenced by the base encoder 112 when generating groups of pictures (GOP's) having predicted and bidirectional frames. Further, the SD frame buffer 114 can temporarily store the reconstructed base pixels until being forwarded to other components within the encoder 100.

The interpolator 116 can interpolate blocks of reconstructed base pixels into blocks of pixels that are size compatible with HD pixel blocks. For example, the interpolator 116 can interpolate 1 1×9 blocks of reconstructed base pixels into 16×16 blocks of reconstructed base pixels. The decomposition unit 110 then can subtract the 16×16 blocks of reconstructed base pixels from correlating blocks of pixels in the original HD sequence to generate the enhancement pixels.

Further, the summing block 118 can sum the 16×16 blocks of reconstructed base pixels with reconstructed enhancement pixel blocks generated by the enhancement encoder 124 to generate summed pixel blocks. The summed pixel blocks can be trimmed to usable values by the clipper 120. For example, the clipper 120 can limit 8 bit summed pixels to values between −128 and 127. The HD frame buffer 122 can buffer the summed pixel blocks for use by the enhancement encoder 124 in creating groups of pictures in the enhancement data bitstream.

Lastly, a data store 126 can be provided for storing the base data bitstream and the enhancement data bitstream. The data store 126 can be an optical storage medium, a magnetic storage medium, a magneto-optical storage medium, an electronic storage medium, or any other storage medium which can store digital data. For example, in one arrangement, the data store 126 can be a DVD. The DVD can be single layer or multi-layer. Moreover, the DVD can contain data on one or two sides. In another arrangement, the data store 126 can be another storage type, such hard disc drive (HDD), RAM, and so on. In such an arrangement, the base and enhancement data streams can be transferred to one or more DVD's from the data store 126.

The base data bitstream can be recorded onto the DVD as a base layer and assigned a stream identification of 0xE0. The enhancement data bitsream can be recorded onto the DVD as an enhancement layer and assigned a stream identification of 0xBF, 0xFA, 0xFB, 0xFC, 0xFD or 0xFE. The stream identifiers can be stored in a pack header associated with physical sectors of the DVD which are used to store the data bitstreams.

In one arrangement, the base layer and enhancement layer can be multiplexed such that SD-DVD players can read and decode the base layer and a hybrid HD-DVD player can read and decode both layers. In another arrangement, the base layer and enhancement layer can be stored on different physical layers of a multi-layer DVD.

Figure 2:
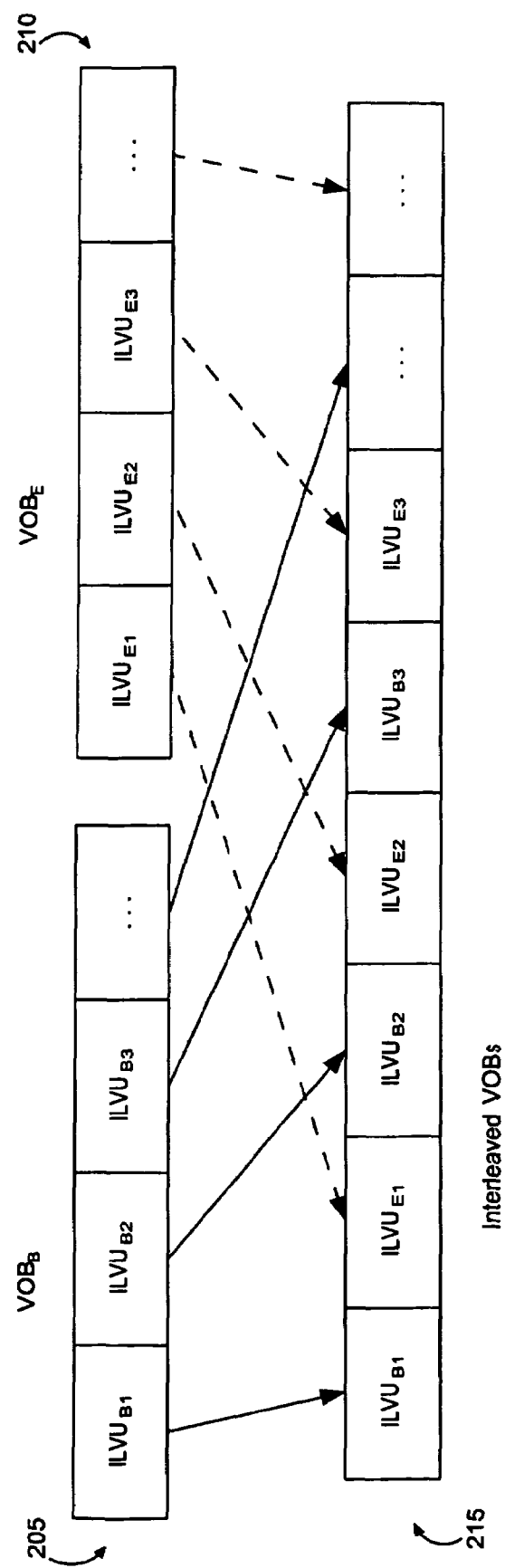
FIG. 2 is a conceptual diagram illustrating a method of interleaving standard definition video data with enhancement video data.

In a preferred embodiment, the base layer and enhancement layer are multiplexed by interleaving the layers. Referring to FIG. 2, video objects within the base layer (VOB$_B$) 205 can be divided into base interleave units (ILVU$_B$) and video objects within the enhancement layer (VOB$_E$) 210 can be divided into enhancement interleave units (ILVU$_E$). Notably, each interleave unit can have one or more video object units (VOBU's). The base interleave units and enhancement interleave units can be stored to the DVD in an alternating fashion to create a string of interleaved video objects 215. As would be apparent, it is preferred that there be an approximately equal number of base interleave units and enhancement interleave units. To reduce the amount of buffering and processing required to achieve seamless playback of the interleave units, it is preferred that a playback time associated with the base interleave units be approximately equal to a playback time associated with the enhancement interleave units.

For example, a video object within the base layer can comprise interleaved video object units ILVU$_{B1}$, ILVU$_{B2}$, ILVU$_{B3}$, etc. Likewise, a video object within the enhancement layer can comprise interleaved video object units ILVU$_{E1}$, ILVU$_{E2}$, ILVU$_{E3}$, and so on. In such an instance, the video object units can be interleaved into the following order: ILVU$_{B1}$, ILVU$_{E1}$, ILVU$_{B2}$, ILVU$_{E2}$, ILVU$_{B3}$, ILVU$_{E3}$.

Time stamps can be added to the base layer and to the enhancement layer. For example, a first time stamp added to the base and enhancement layers can be a decoder time stamp (DTS) which synchronizes decoding of video to insure that the video can be played back at an appropriate time. A second time stamp can be a presentation time stamp (PTS) which can be used to coordinate presentation of pictures within a video stream. Accordingly, presentation of video can be synchronized with correlating audio portions of a title. The PTS and DTS time stamps can be stored in a header of each packetized elementary stream (PES). There can be one header associated with each physical sector on the storage medium. These time stamps can be associated with correlating intra (I) pictures.

The seamless branching aspects of DVD typically operate by providing multiple program chains. Each program chain can provide an alternate version of video playback. Program chains typically contain programs, which are ordered collections of pointers to cells within video objects. Each cell can be associated with one or more interleave units. The program chains can link cells together and indicate what order the cells are to be played. Importantly, individual cells can be used by more than one program chain.

In the present invention, at least two program chains (PGC's) can be created, one for SD playback of the DVD, and one enhancement program chain which can be used for HD playback of the DVD. The SD program chain can be recognizable by an SD-DVD player and can link together the cells associated with the base interleave units. Accordingly, the SD program chain can be used to generate an SD bitstream for playback.

The enhancement program chain can be recognized by hybrid HD-DVD players. In one arrangement, the enhancement program chain can be provided without an assigned entry point. The enhancement program chain can be designed such that the enhancement program chain can be merged with the SD program chain to form a hybrid program chain. The hybrid program chain can be formed once the HD-DVD recognizes that a particular disc is a hybrid HD-DVD. In this arrangement, the hybrid program chain can link together the cells associated with the base interleave units and the cells associated with the enhancement interleave units in an order appropriate for HD playback.

In an alternate arrangement, the enhancement program chain can link together the cells associated with the enhancement interleave units and can be used to generate an enhancement bitstream. The enhancement bitstream can be merged with the SD bitstream to generate an HD bitstream for HD playback.

Referring to FIG. 3, a down-sampling algorithm 300 is shown which can be performed by the decomposition unit to generate the base pixels. Schematically, an original HD block 310, represented as A$_{16\times16}$, can be divided into four 8×8 sub-blocks 320, 330, 340 and 350, respectively. An 8×8 integer transform can be applied in parallel to each of the sub-blocks by the 8×8 integer transformers 321, 331, 341 and 351, respectively. Next, low-pass filtering can be performed on each of the transformed sub-blocks by low-frequency sub-block extractors 322, 332, 342 and 352, respectively. The low-pass filtering can extract the low frequency transform coefficients from the 8×8 sub-blocks. The low-pass filtered sub-blocks then can be zero-padded to 5×4 sub-blocks by the zero-padding blocks 323, 333, 343 and 353, respectively. Inverse transforms then can be applied to each of the zero-padded sub-blocks by 5×4 inverse transformers 324, 334, 344 and 354, respectively, to provide new sub-blocks 325, 335, 345 and 355 that make up a new block 312. An integer transform then can be applied to the new block 312 by a 10×8 integer transformer 314, which can be coupled to an 11×9 zero-padder 316. The zero-padder 316 can be coupled, in turn, to an 11×9 inverse transformer 318 that provides the base layer pixels, represented as B$_{11\times9}$.

All of the transformations shown in FIG. 3 can be coded as a single matrix transformation, making it possible to implement the procedure as a two-step process. The two step process can comprise a post-multiplication by a first downsampling matrix for horizontal downsampling, followed by a pre-multiplication by a second downsampling matrix for vertical downsampling. Alternatively, the pre-multiplication can be performed first, followed by the post-multiplication. This two step decomposition provides greater flexibility in the ratio of resolutions between the enhancement and base layers.

The matrices that are provided for the horizontal and vertical downsampling will depend on which coefficients are coded into the base layer. Accordingly, if the coefficient selection is adaptive, either multiple versions of the matrices will be required, or additional processing steps will be required to complete the downsampling.

Referring now to FIG. 4, an 8×8 sub-block 400 of transform coefficients is shown which corresponds to the sub-blocks 320, 330, 340 and 350 of FIG. 3. The 8×8 sub-block 400 can include an upper left portion 410, which can include the most significant transform coefficients which are extracted by the low-frequency sub-block. The remaining transform coefficients can be used to create the enhancement layer 412. In one arrangement, the upper left portion can be a 5×4 sub-block of transform coefficients. However, the upper left portion also can be smaller than a 5×4 sub-block. Accordingly, a greater portion of the 8×8 sub-block 400 can be encoded in the enhancement layer using a coding scheme which is more efficient than the coding scheme that is likely to be used for the base layer. Further, the smaller number of base layer coefficients can be coded to give better accuracy in the base layer for a given base layer bit rate. Hence, these coefficients may not need to be refined in the enhancement layer. Notably, the selection of coefficients for the base layer can be either pre-determined or adaptive.

Figure 5:
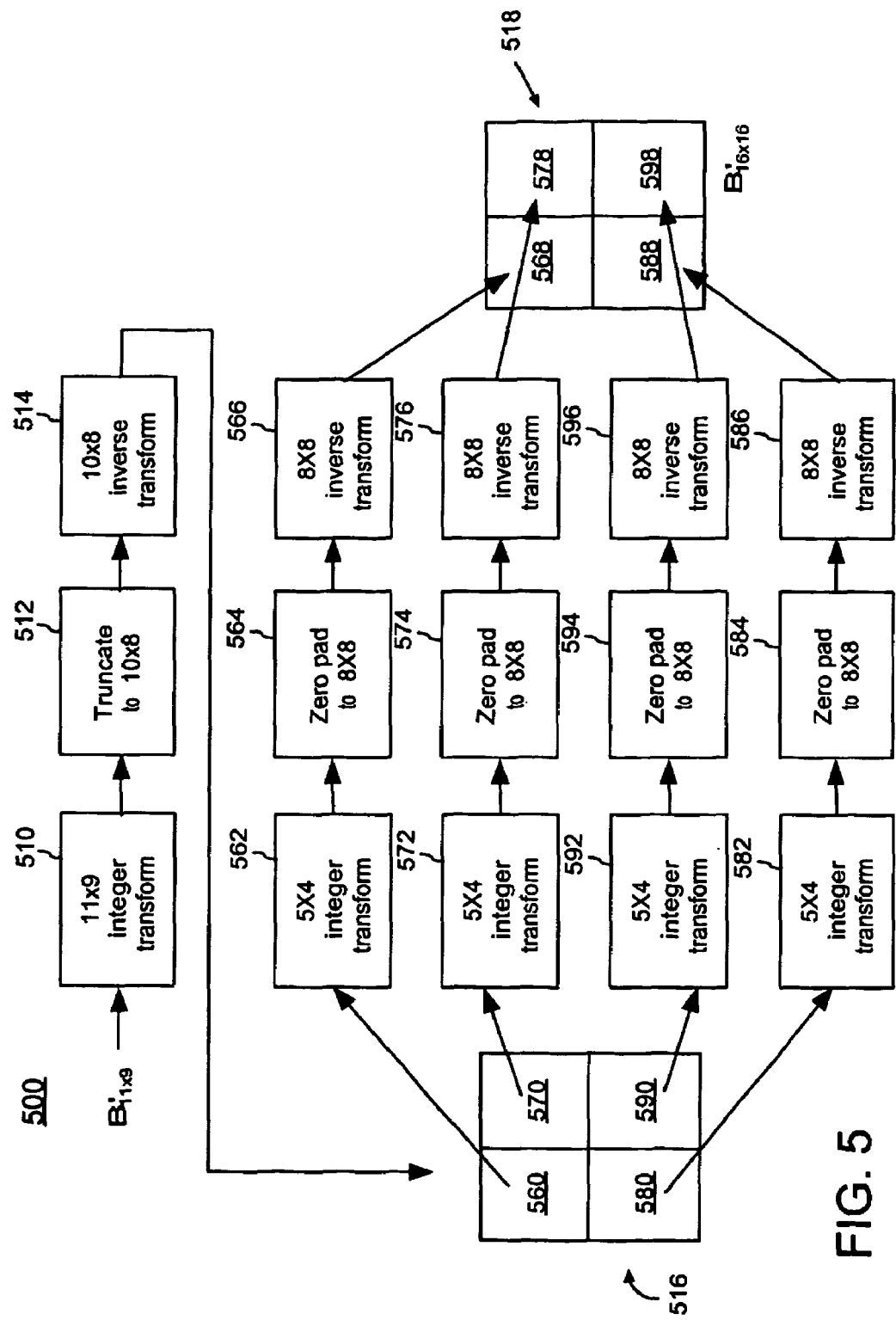
FIG. 5 is a block diagram for an interpolation algorithm usable with the encoder of FIG. 1.

Referring to FIG. 5, an interpolation algorithm 500 is shown which can be performed by the interpolator to convert blocks of reconstructed base pixels into blocks of pixels that are size compatible with HD pixel blocks. The algorithm 500 includes an 11×9 integer transformer 510 for transforming the reconstructed version of $B_{11 \times 9}$, denoted $B'_{11 \times 9}$. The block 510 can be coupled to a 10×8 truncation block 512 which truncates pixel values in $B'_{11 \times 9}$. A 10×8 inverse transform block 514 also can be provided that outputs an intermediate block 516. The intermediate block 516 can include four sub-divided sub-blocks 560, 570, 580 and 590, respectively. An integer transform can be applied to each of these sub-blocks by 5×4 integer transformers 562, 572, 582 and 592, respectively. Next, the transformed sub-blocks can be zero-padded by 8×8 zero-padders 564, 574, 584 and 594, respectively. The zero-padded transformed sub-blocks then can be inverse transformed by 8×8 inverse transformers 566, 576, 586 and 596, respectively, to form corresponding new sub-blocks 568, 578, 588 and 598. The new sub-blocks 568, 578, 588 and 598 can collectively make-up block 518, represented as $B'_{16 \times 16}$.

As with the decomposition, the interpolation can be provided in two steps using a matrix transformation. The first step can include a pre-multiplication by a first interpolation matrix to interpolate vertically, and then a second step can be performed which includes a post-multiplication by a second interpolation matrix to interpolate horizontally. This two step process provides greater flexibility in the ratio of resolutions between the enhancement and base layers. The pre-multiplication and post-multiplication can be performed in any order, although the order in which the multiplications are performed should be the same for both the encoder and the decoder. Again, if the coefficient selection is adaptive, either multiple versions of the matrices will be required, or additional processing steps will be required to complete the interpolation.

Figure 6:
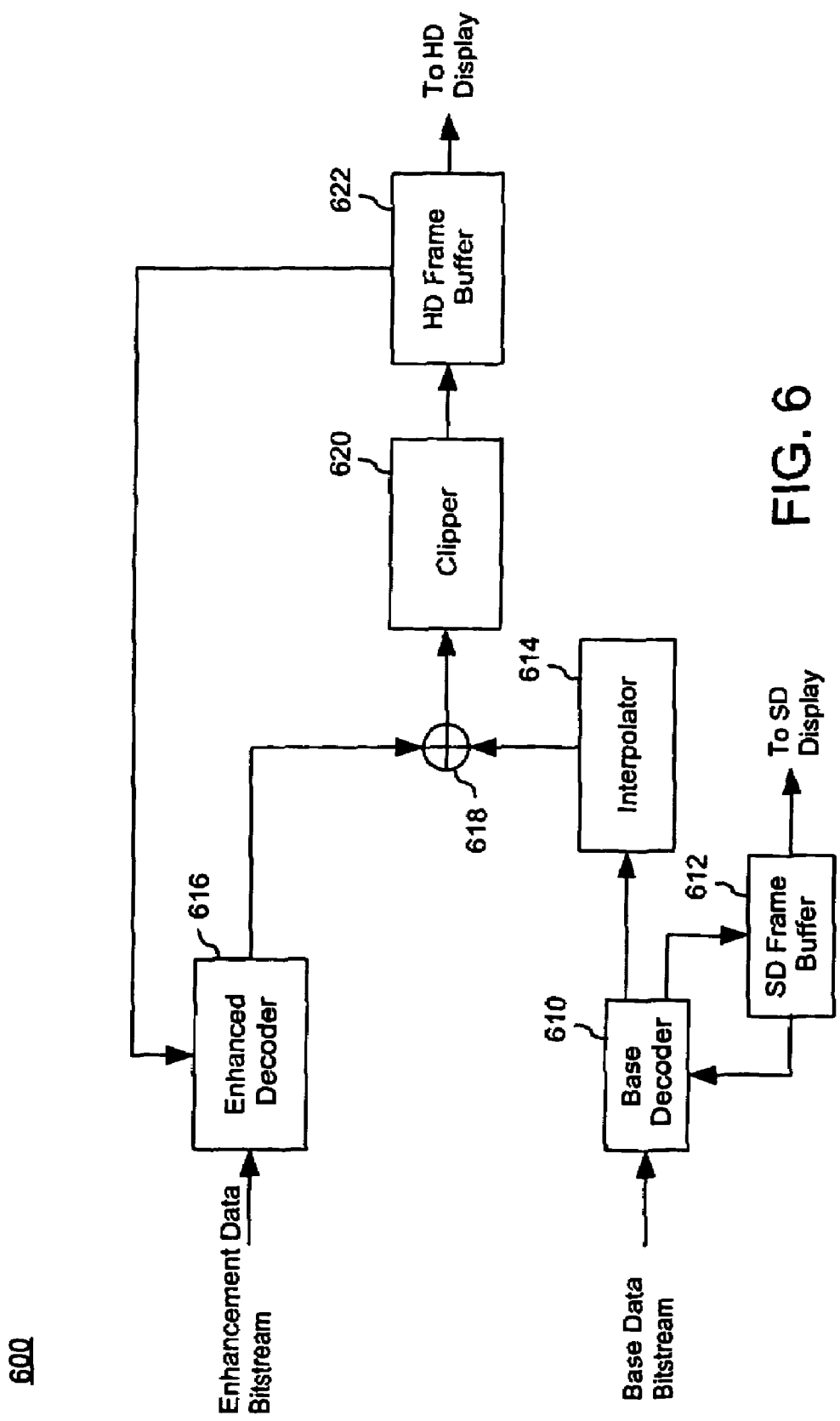
FIG. 6 is a block diagram illustrating hybrid scalable decoder which is useful for understanding the present invention.

Referring to FIG. 6, a hybrid scalable decoder (decoder) 600 is shown which can be used to decode the base data bitsream and the enhancement data bitstream to generate the SD and HD video streams, which can be forwarded to one or more video displays. The decoder 600 can be realized in hardware, software, or a combination of hardware and software. For example, the encoder 600 can include one or more processors which execute program code and processes data. Such a processor can be a central processing unit (CPU), a digital signal processor (DSP), an application specific integrated circuit (ASIC) or any other suitable processor. The decoder 600 can include a base decoder 610, an SD frame buffer 612, an interpolator 614, an enhancement decoder 616, a summing block 618, a clipper 620, an HD frame buffer 622, and an enhancement encoder 124.

The base decoder 610 can receive the base data bitstream, for example after it has been read from a DVD by a playback interface, and decode the base data bitstream into an uncompressed format. For example, the base decoder 610 can decode the base data bitstream from an MPEG-2 format into a luminance and chrominance video stream having SD frames formed of pixels reconstructed in the decoding process. The luminance and chrominance video stream then can be forwarded to a display, or further encoded into another format, for example into an NTSC, PAL, SECAM, S-video, or any other suitable format. The base decoder 610 can be coupled to an SD frame buffer 612 for buffering standard-definition frames during the decoding process. The SD frame buffer 612 can further provide an output suitable for an SD display.

The enhancement decoder 616 can decode an enhancement data bitstream, for example after it has been read from a DVD by a playback interface, and decode the enhancement data bitstream into an uncompressed format. For example, the enhancement decoder 616 can decode the enhancement data bitstream from an H.264 format into blocks of enhancement pixels which can be combined with blocks of reconstructed SD pixels for use in generating an HD video stream.

The interpolator 614 can receive reconstructed base pixels from the base decoder 610 and interpolate blocks of the reconstructed base pixels into blocks of pixels that are size compatible with HD pixel blocks. For example, the interpolator 614 can interpolate 11×9 blocks of base pixels into 16×16 blocks of base pixels. The interpolation process can follow an interpolation algorithm which is much the same as the interpolation process described for FIG. 5.

The summing block 618 can sum blocks of base pixels generated by the interpolator 614 with blocks of pixels generated by the enhancement encoder 616 to generate reconstructed HD frames. Pixel values within the reconstructed HD frames can be trimmed to usable values by the clipper 620. For example, the clipper 620 can limit 8 bit pixels to values between −128 and 127. The HD frame buffer 622 can buffer the reconstructed HD frames for use by the enhancement decoder 616 in creating the enhancement pixels during the decoding process. The HD frame buffer also can provide an output suitable for an HD display. For example, the output can provide a luminance and chrominance video stream having the reconstructed HD frames.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suitable. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

The invention claimed is:

1. A method of providing multiple versions of a digital recording comprising the steps of:
    using a first stream identification, encoding a base layer comprising base data representing a first version of a digital recording; and
    using a second stream identification, encoding an enhancement layer comprising enhancement data which can be combined with said base data to represent a second version of the digital recording, wherein said base layer and said enhancement layer are stored on a single side of a storage medium and a remaining side, other than the single side, of said storage medium is used for identification and labeling of said storage medium.

2. The method of claim 1, wherein said first stream identification is 0xE0.

3. The method of claim 1, wherein said second stream identification is at least one value selected from the group consisting of 0xBF, 0xFA, 0xFB, 0xFC, 0xFD and 0xFE.

4. The method of claim 1, further comprising at least one of the step of multiplexing said base layer and said enhancement layer and the step of interleaving said base layer and said enhancement layer.

5. The method of claim 1, further comprising the step of storing said base layer and said enhancement layer on different physical layers of a storage medium.

6. The method of claim 1, wherein said encoding said base layer step further comprises the step of coding said base data in a format substantially similar to MPEG-2.

7. The method of claim 1, wherein said encoding said enhancement layer step further comprises the step of coding said enhancement data in a format substantially similar to at least one format selected from the group consisting of H.264.

8. The method of claim 1, wherein said first version of the digital recording comprises standard definition program content and said second version of the digital recording comprises high definition program content.

9. The method of claim 1, wherein said storage medium is a digital video disc (DVD).

10. A DVD medium comprising:
   a base layer having a first stream identification and comprising base data representing a first version of a digital recording; and
   an enhancement layer having a second stream identification and comprising enhancement data which can be combined with said base data to represent a second version of said digital recording,
   wherein said base layer and said enhancement layer are stored on a single side of the DVD medium and a remaining side, other than the single side, of the DVD medium is used for identification and labeling of the DVD medium.

11. The DVD medium of claim 10, wherein said first stream identification is 0xE0.

12. The DVD medium of claim 10, wherein said second stream identification is at least one value selected from the group consisting of 0xBF, 0xFA, 0xFB, 0xFC, 0xFD and 0xFE.

13. The DVD medium of claim 10, wherein at least one of said base data and said enhancement data are multiplexed and said base data and said enhancement data are interleaved.

14. The DVD medium of claim 10, wherein said base data is stored in a format substantially similar to MPEG-2.

15. The DVD medium of claim 10, wherein said enhancement data is provided in a format substantially similar to H.264.

16. The DVD medium of claim 10, wherein said first version of the digital recording comprises standard definition program content and said second version of said digital recording comprises high definition program content.

17. The DVD medium of claim 10, wherein the DVD medium is a multi-layer DVD, and said base layer and said enhancement layer are stored on different physical layers of said multi-layer DVD.

18. The method of claim 1, wherein said base layer is formed by applying a two step transformation process to an input high definition sequence, the two step transformation process using a post-multiplication step by a first downsampling matrix for horizontal downsampling and a pre-multiplication step by a second downsampling matrix for vertical downsampling, and said enhancement layer is formed by applying a two step interpolation process to reconstructed base pixels, the two step interpolation process using a pre-multiplication step by a first interpolation matrix for vertical interpolation and a post-multiplication step by a second interpolation matrix for vertical interpolation.

19. The DVD medium of claim 10, wherein said base layer is formed by applying a two step transformation process to an input high definition sequence, the two step transformation process using a post-multiplication step by a first downsampling matrix for horizontal downsampling and a pre-multiplication step by a second downsampling matrix for vertical downsampling, and said enhancement layer is formed by applying a two step interpolation process to reconstructed base pixels, the two step interpolation process using a pre-multiplication step by a first interpolation matrix for vertical interpolation and a post-multiplication step by a second interpolation matrix for vertical interpolation.

* * * * *